Sept. 24, 1968 R. G. LEAVITT 3,402,488
IDENTIFICATION CARD
Filed Oct. 11, 1965 3 Sheets-Sheet 1

INVENTOR
RALPH LEAVITT
BY *Sol B. Wick*
ATTORNEY

Sept. 24, 1968   R. G. LEAVITT   3,402,488
IDENTIFICATION CARD
Filed Oct. 11, 1965   3 Sheets-Sheet 2

INVENTOR
RALPH LEAVITT

BY
ATTORNEY

Sept. 24, 1968   R. G. LEAVITT   3,402,488
IDENTIFICATION CARD
Filed Oct. 11, 1965   3 Sheets-Sheet 3
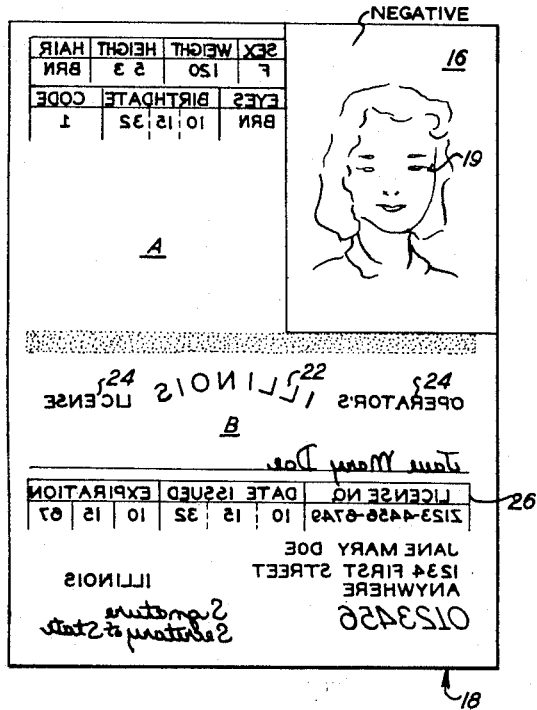
INVENTOR
RALPH LEAVITT
BY Sol B. Wick
ATTORNEY

United States Patent Office 3,402,488
Patented Sept. 24, 1968

3,402,488
IDENTIFICATION CARD
Ralph G. Leavitt, 2150 Lincoln Park W.,
Chicago, Ill. 60614
Filed Oct. 11, 1965, Ser. No. 494,679
11 Claims. (Cl. 40—2.2)

My invention relates to production of identification-type cards of the character of drivers' licenses, credit cards and the like and includes improvements directed to optimum safety and utility.

More particularly the card embraces several novel structural features of the cards as well as novel procedural steps for construction for optimum cooperation with computer devices for interchange, emplacement on the card and recording of information. The improved structural features of the card include raised lettering as a printing plate for easy use for recording of the information thereon, as well as safety features to make the product difficult to forge or vary the preset information.

A primary aspect of this invention is in the reproduction of much of the material upon a card photographically, both a photograph of the individual owner of the card as well as applicants applied signature and essential data relating to that individual being applied photographically.

Another feature of the card is that it can be folded to impart a larger area of information by using both surfaces upon which the information may be recorded photographically.

A further feature of the card is that a portion of one surface only of the card may carry an embossment of indicia, the back side of the embossed card being protectively covered by folding over of the opposite side for optimum utility, including difficulty of modifying the single surface embossment in any way.

Another feature of the card is that the data may be placed upon the card entirely automatically in response to background information available from a computer which may assemble and print the information at least on a preliminary form from which the information may be photographically transferred to the card.

A further feature of the card is that despite embossment of one surface it may be enclosed in hard-wearing plastic for rugged use over long periods of time without damage.

Another feature of the invention is in the manner of forming the card, assembling a photograph as well as data for applying both photographically upon the card, and sealing the data with various fraud detection means incorporated in a completely tamperproof card of rugged construction. Data may be supplied entirely photographically or a portion only may be supplied photographically and a portion by embossing.

Accordingly, it is a primary object to construct the card having the aforesaid features, preferably following the improved procedure, and other objects will be inherent.

Identifying cards may be for various purposes but it is useful to place data thereon which is significant background information, preferably in code, not readily understood by casual inexperienced observation. For instance, a driver's license may be coded so that a professional police officer or court officer examining the card would be able to readily understand background violations. Alternately, a credit card may have coding thereon which would furnish information on the spot as to credit rating. Various cards may be varied with coded information specifically useful to the exact purpose for which the card was issued. That kind of information may be stored in a central computerized memory storage system which can be relayed back to the agency about to issue a new card for incorporation into the available card information to be emplaced thereon.

The invention is further described in relation to the drawings which follow:

FIG. 3 is a composite negative photograph of the application form card of FIG. 2 with the teletyped data corresponding to record of an individual licensee, together with a negative photograph of the individual whom the data will identify;

FIG. 4 illustrates the continuous photographic reproduction of license cards from the negative of FIG. 3 on a continuous roll of photographic paper;

FIG. 6 illustrates embossment with identifying indicia raised from a portion of the card, which will be disposed upon one surface only; and FIG. 7 illustrates the folding of the card having embossment on one face with adhesive layer on the inner surfaces for permanently securing both layers of the folded halves together.

Figure 1:
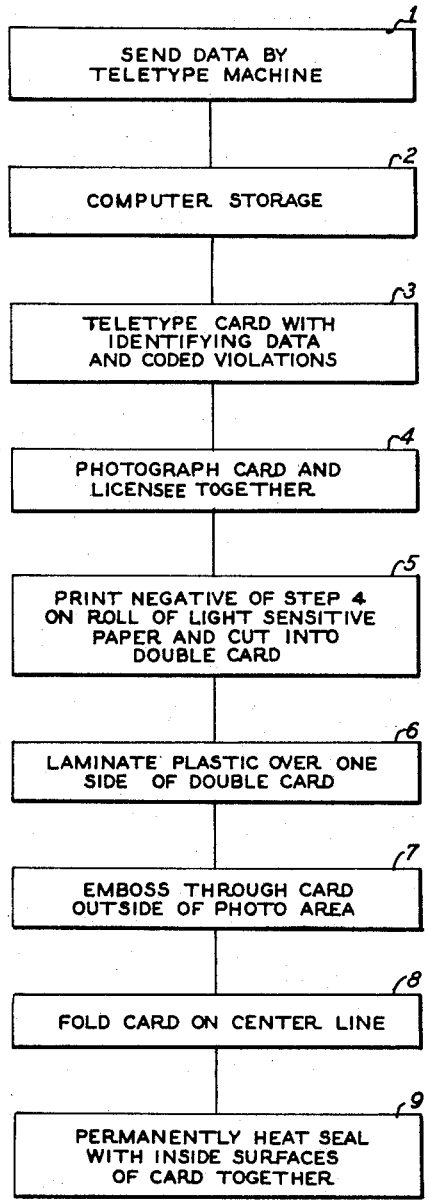
FIG. 1 is a flow diagram setting forth procedural steps for forming as well as assembling parts of a tamperproof identification card according to the present invention.
Figures 2, 5:
FIG. 2 is a preliminary card form for application for a driver's license.
FIG. 5 illustrates the photographed card on one side, as in FIG. 3, cut from the roll of FIG. 4 and coated with a layer of protective plastic adhered therover.

The invention here is described in relation to the operation of a driver's license system for forming a typical tamperproof driver's license according to the present invention. Referring first to FIG. 1, when an applicant for a driver's license applies and furnishes his name and address to the agent responsible for producing the driver's license, the agent operator may make a written record. According to the present invention in preferred operation, it would be necessary only to supply the information to a teleprinter which would type the name and address and perhaps other pertinent data available from the licensee, but the operator through the teletype machine in proper circuit (not shown) would directly communicate with a computerized memory storage system which, in turn, as the output of the computer would return for typing all of the data, including in code the driver's past history, if any, of violations or other necessary information that could usefully appear upon the card. The output of such computerized data is preferably placed by typing upon a data card 10 as shown in FIG. 2. As seen in FIG. 2 the card 10 may be a preprinted form card of paper or paperboard, with data block 12 above a center fold line 14 distributed to one upper side to leave a photographic space 16 to the upper left. The lower half 17 of the card has other data space which will be filled in by the typewriter or teletypewriter when coded information is supplied.

That card 10 as a next step will be placed in a photographic camera (not shown) of the type known for photographing card information simultaneously with the photographic reproduction of an individual.

In practical operation of the system to this point, the operator would initially feed by teleprinter programming initial data requesting a central computer (not shown) to identify and form the completed requisite data upon a card 10 for a particular applicant, and the computer per se would further operate the teleprinter which would form a data card 10 almost immediately after the supply of the requisite programming information.

Thereafter, and with almost no loss of time, the data reproduced by the teleprinter as the output of the computer, even at a remote point, from the computer, such as a member driver's license bureau, where the applicant has applied for license, will then simultaneously photograph the data card in conjunction with the applicant to form a negative 18, as shown in FIG. 3, containing a reproduction of the applicant as well as the information data. That negative 18 is a typical photographic negative which can be filed and stored as such; particularly in the driver's license bureau it may be one of a large series of negatives accumulated from a line of applicants in a busy license bureau, each negative 18 being part of a series of many formed in rapid succession of individual applicants. Consequently, a series of photographs 22 from these negatives can be made by camera 19 upon a roll 20 of photographic paper as shown in FIG. 4, each photograph to comprise an individual card 22 and be cut from the roll after development into proper card dimensional sections.

The data card form 10 of FIG. 2 may have on one side a block diagram 12 preprinted thereon indicating spaces 13 for information such as sex, height, weight, hair color, etc., as to typical information to be emplaced upon the driver's license. It even may have a space 17 for code information supplied from the memory of the machine. The entire data block 12 will be positioned to fall upon one side A of the ultimately formed complete card after folding upon the safety line 14, dividing the card into opposite side halves at approximately its middle point 14. The data block 12 will be placed to one upper side of the card, leaving a space 16 in which the photograph 19 will ultimately appear.

The opposite side B of the card may have various standard insignia such as the authorizing agency's name 21 or indication of the nature of the card 24; namely, that it is a driver's license, and contains spacing for block diagram information 26.

The material on the upper portion to form one side of the card indicated as A, consequently, is spaced to allow insertion of all of the requisite material for that side of the card, whereas the material on the lower portion, to become side B, is spaced to allow requisite information upon what will become the opposite side B of the card after forming and folding. Preferably the side A will also have spacing 27 to allow application of embossed lettering 28 as shown in exaggerated detail FIG. 6. Particularly, it will be noted that the spacing 27 for embossed raised lettering 28 will not intercept important identifying data or photographic reproduction of the appearance of the individual so that the raised lettering will not interfere or distort with a proper view and observation either of the significant data or the photograph of the individual. Obviously, the exact choice of spacing or distribution of the embossing and photographed substance on either side of the card can be varied while still maintaining the protective values in the material applied to the card.

As shown in FIG. 2, the data card 10 may be preprinted with the block form for spacing of data exactly as shown in FIG. 2. The data card, itself, in alternate procedure, may have nothing preprinted thereon, but the data actually supplied by the teleprinter. The driver's license card would be ultimately formed photographically, transmitting from the negative only data itself, placed in the proper card position. In this alternate procedure, the roll of photographic paper 20 itself may have the preprinted matter thereon so that when a photograph is applied of the data, the data will appear in the final card in the correct position with respect to the preprinted matter on the card. Consequently, it is not critical, although it is preferred, for the preprinted matter to be placed upon the data card which can be filed away and identified as useful form data card in a central drivers' license agency.

According to the step 4 of FIG. 1, the individual licensee and the teleprinted data card 10 are photographed simultaneously to form a composite negative 18 (FIG. 3) and that negative, in the next step 5 of FIG. 1 is printed as one of a series of photographs to form a series of drivers' licenses photographically upon a roll of photographic paper, each bearing the data as shown in FIG. 2 of each individual. The roll 20 is then severed into individual card photographs. Of course, the photographing can be applied as well upon any preformed cards having a light-sensitive coating, rather than the roll.

Thereafter, in the next step 6, a thin thermoplastic film is sealed upon the developed photographic cards. Useful protective films are Mylar (terephthalate polyester), polyethylene, polypropylene, and the like, of which I prefer Mylar for its better clarity and wear resistance.

The plastic film coating will be dimensioned to conform exactly to the size of the card; that is, there will be no overlap. It may be useful, where a series of photographs are reproduced on a continuous roll from a series of negatives in the formation of drivers' licenses, produced as described, to develop the entire exposed photographic roll and then apply a single elongated sheet of protective plastic over the entire roll, finally cutting each individual photographically reproduced card into individual plastic coated cards before folding. Of course, somewhat more laboriously, each card individually may have applied thereto the plastic film.

The photo-reproduced and plastic-coated card will then have embossed on the surface A in the space 27 additional lettering 28 raised from the surface by an embossing typewriter or die as shown in FIG. 6, the raised lettering being then useful for transfer as by printing the information embossed upon the card and represented by the raised lettering, onto another surface, such as paper. For this purpose, inasmuch as ordinary photographic paper is generally not strong enough to withstand significant pressure, a sheet of plastic such as polyvinyl chloride is preferably laminated to the back side of the card, behind the space 27, so that the laminate may extend only over the upper end of the card for purposes of reinforcing the embossment; or it may extend over the entire back side of the card. Thereafter, the photographed card bearing the Mylar film laminated upon the top side of the card protectively over the photographed material, with the polyvinyl chloride layer laminated on the back side, are embossed with raised letters 28 as shown in FIG. 6, in the area 27 of the card.

The polyvinyl chloride film is thermoplastic, whereby the card can be folded along the center of the fold line 14 and heat sealed, the upper to the lower back sides. The heat-softened surface of the polyvinyl chloride serves to bond the upper and lower back surfaces of the card together in folded position as shown in FIG. 7. Alternately, a film of adhesive may be coated on the back side of the card and the folded card can then be permanently sealed together by adhesive, and the polyvinyl chloride film reenforcement can be omitted. The heat seal of a film of plastic or of an applied adhesive on the rear surface of the card is maintained and selected to bond upper and lower portions of the back side of the card together so firmly and securely that the laminate construction thus formed can never be separated without destroying the card.

However, the embossed material 28 formed in the card in the area 27 before folding, becomes permanently supported in the folded card so that the raised letters remain thus raised firmly without being depressed in use nor abrasively worn off in use, substantially in view of the protective front coating film of Mylar. Moreover, it will be noted that this embossment is in an area away from and will not interfere with the clear visibility of all of the lettering and data as well as the individual photograph appearing on the card. Finally, it will be seen that the card was reproduced almost entirely photographically from information supplied automatically with very few steps required to form the card from the single visitation by the applicant to the license bureau.

In an alternate construction, the card may be formed entirely of polyvinyl chloride. For this purpose the photographic paper itself comprises a film of polyvinyl chloride which is first coated with a film of polymer which has greater hydrophilic character than the polyvinyl chloride per se. For example, the polyvinyl chloride is coated either with a relatively hydrophilic film such as polyvinyl acetate, polyvinylidene chloride, polyvinyl acetal, or copolymers of any of these with each other, or with more polyvinyl chloride. Such polymer film is hydrophilic and will accept a photographic emulsion comprising largely gelatin containing light-sensitive compounds. The photographed material from a negative 18 may be reproduced as described above upon the light-sensitive polyvinyl chloride base, and then directly embossed from the upper half portion 27 as described above, without additional laminated supporting film for that embossment, and the outer photographed surface may or may not be further protected with another film of Mylar as described. However, no additional adhesive is needed to heat bond upper and lower portions of the folded card together as described since the polyvinyl chloride as described above is heat sealable per se. However, it is always preferred to use an outer film coating of Mylar thereon, or other protective film material as described. This has te benefit both of reducing wear and of supporting or sealing therein or otherwise imparting hidden indicia or identification marks which may be applied thereto under the Mylar film or stamped thereon immediately prior to covering with the Mylar film. Such marks as fluoresce and are visible under hidden light such as infra-red or ultra-violet light will be used. Such additional hidden identification markings serve to help establish the authenticity of the card.

It will be noted that the fold line 14 is a wide band of printed dots, but these may be of other regular pattern so that after folding any attempt to reopen or replace one side of the card will be easily noticeable by interruption of the pattern of the fold band 14.

As thus described, many novel features are here combined in the formation of an identification card. The card is reproduced entirely photographically to include both data and a photograph of the individual to be identified. The photographic reproduction of both of these elements are made simultaneously upon photo-sensitive paper or plastic from an individual negative whereby many different cards may be made in a series from a single roll of photographic paper, thus greatly reducing the cost of establishing a credit or driver's license system. All of the data may be produced from a central memory storage computer controlled system, returning data by teleprint writer to a data card which is then photographed with the individual. The identification card itself contains embossment from only one side in an area which does not interfere with the photographic material thereon to obliterate easy observation thereof and prevent reading of any data or photographic material. The card may contain secret code information supplied by the computer. The outer surfaces of the card are protectively sealed with a plastic film so that they are wear resistant and not easily defaced, forged or modified in any way. It carries an identifying fold line 14 whereby distinct halves of the card cannot be separated and replaced by forged halves, that fold line 14 easily indicating by the printed pattern thereof whether it has been tampered with. Finally, the card preferably includes a polyvinyl chloride film or is entirely formed of polyvinyl film through which strong embossment is placed for permanent embossed construction and which is easily heat sealable after folding to protect the embossment.

Certain modifications will occur to those skilled in the art and, accordingly, it is intended that the description be regarded as illustrative and not limiting except as defined in the claims appended hereto.

I claim:

1. An identification card comprising a laminate of at least two sheets adhesively secured together and having visible indicia disposed on both exposed surfaces, said sheets formed of a heat sealable thermoplastic having a hydrophilic coating thereon and a light-sensitive gelation coating on said hydrophilic coating, most of said indicia being photographically reproduced and comprising both a photograph of an individual being identified, and data relevant to the identification of the same individual, said card having an outer transparent film layer protectively secured as an additional layer upon said laminate bearing said photographic material on both exposed surfaces.

2. The laminated card as defined in claim 1 having a portion of at least one surface free of photographic indicia therein, said photoprint-free portion having an embossment comprising raised indicia extending outward through only one layer of said laminate.

3. The identification card as defined in claim 1 having a transparent film protectively secured upon said photographic material as a laminate on both exposed surfaces of said laminated card, a portion of at least one surface being free of photographic indicia therein, said portion having an embossment comprising raised indicia extending in said photoprint-free portion through only one layer of said inner laminate and through the outer transparent film covering of one surface of the card.

4. Identification card as defined in claim 1, each layer comprising a sheet of polyvinyl chloride having a hydrophilic polyvinyl coating thereon and a light-sensitive gelatin coating on said hydrophilic layer.

5. An identification card comprising a sheet of photographic print paper having photographically reproduced material photoprinted thereon in selected areas comprising the photograph of an individual to be identified and data relevant to the identification of the individual, said sheet having a portion of its surface free of photoprint material therein, an elongated visible pattern disposed as a center line of said sheet dividing the data thereon into upper and lower portions as a tamperproof fold line, a transparent film protectively secured upon one surface of said sheet over said photographic material as a laminate, a polyvinyl chloride sheet laminated to the back of said photographed sheet as an inner layer disposed at least over the portion of said sheet free of photoprint material, embossed indicia impressed in said photoprint-free area extending upward through said laminated polyvinyl chloride sheet and the sheet having the photographed surface, said embossment comprising raised indicia extending up from said photographed surface, said sheet being folded into upper and lower halves through said fold line and adhesively sealed back to back to include said polyvinyl chloride as an inner layer into a permanently bonded card having photographically reproduced data exposed on both surfaces, whereby the embossment extends outward from only one exposed surface of the card.

6. A polyvinyl chloride film having a hydrophilic polyvinyl coating on one surface thereon and a light-sensitive gelatin composition secured upon said hydrophilic layer.

7. The method of forming an identification card comprising initially printing identifying data upon a preliminary card, the data being distributed upon said card in the approximate space arrangement as it is to appear upon a final identification sheet, photographing said data card together with the individual to be identified to form a photographic negative with the individual and data in separately selected spaces, said photographic material being distributed in upper and lower portions of said negative about a fold line, printing said negative upon a photographic sheet surface having photo-sensitive material thereon to photographically reproduce the negative as a positive photoprint thereon, securing a transparent protective film over said sheet of photographic printed material, folding said sheet about a center fold line and adhesively securing upper and lower back sides of said folded sheet together into a laminated composite card having the photographic material distributed on both exposed sides thereof.

8. The method of claim 7 wherein the preliminary data card is printed by a teleprinter at least a portion of the printed data material being secured and printed thereon from the memory of a computer.

9. The method of claim 7 wherein the photographic material is distributed and photoprinted upon a photographic sheet to leave a portion of the surface of said sheet free of print material, embossing the photoprinted card to raise embossed letters upward from the back side of said sheet and through the transparent film thereon in said photoprint-free area, and then folding and adhesively sealing the folded upper and lower halves of said sheet together about a central fold line into a laminated card whereby an unembossed portion forms a backing support for the embossed portion with the photographic material visibly exposed on both surfaces of said card.

10. The method of claim 7 wherein the photographic material is distributed and photoprinted upon a photographic sheet to leave a portion thereof free of photoprint material, laminating to the back side of said photographed sheet a polyvinyl chloride film at least over the photoprint-free area, embossing the photo-printed card to raise embossed letters from the back side outward through both the polyvinyl chloride and transparent film thereon in the photoprint free area and then folding and heat sealing the upper and lower halves together about a center fold line whereby the unembossed portion forms a backing support for the embossed portion with photographic material visibly disposed on both surfaces of said card.

11. The method as defined in claim 7 wherein the photoprint paper is a sheet of polyvinyl chloride having a hydrophilic polyvinyl plastic film thereon and a photosensitive layer supported on said hydrophilic film.

References Cited

UNITED STATES PATENTS

| | | | |
|---|---|---|---|
| 1,322,293 | 11/1919 | Effrig | 283—7 |
| 2,802,418 | 8/1957 | Carver et al. | 40—2 |
| 2,835,993 | 5/1958 | Whitehead | 40—2.2 |
| 2,984,030 | 5/1961 | Hannon | 40—2.2 |
| 3,069,793 | 12/1962 | Francescon | 40—2.2 |

EUGENE R. CAPOZIO, *Primary Examiner.*

WENCESLAO J. CONTRERAS, *Assistant Examiner.*